3,225,409
ADOBE MAKING MACHINE
Vearn J. Huffaker, Santa Fe, N. Mex., assignor of one-half to Albert P. Branch, Santa Fe, N. Mex.
Filed Dec. 11, 1963, Ser. No. 329,643
5 Claims. (Cl. 25—41)

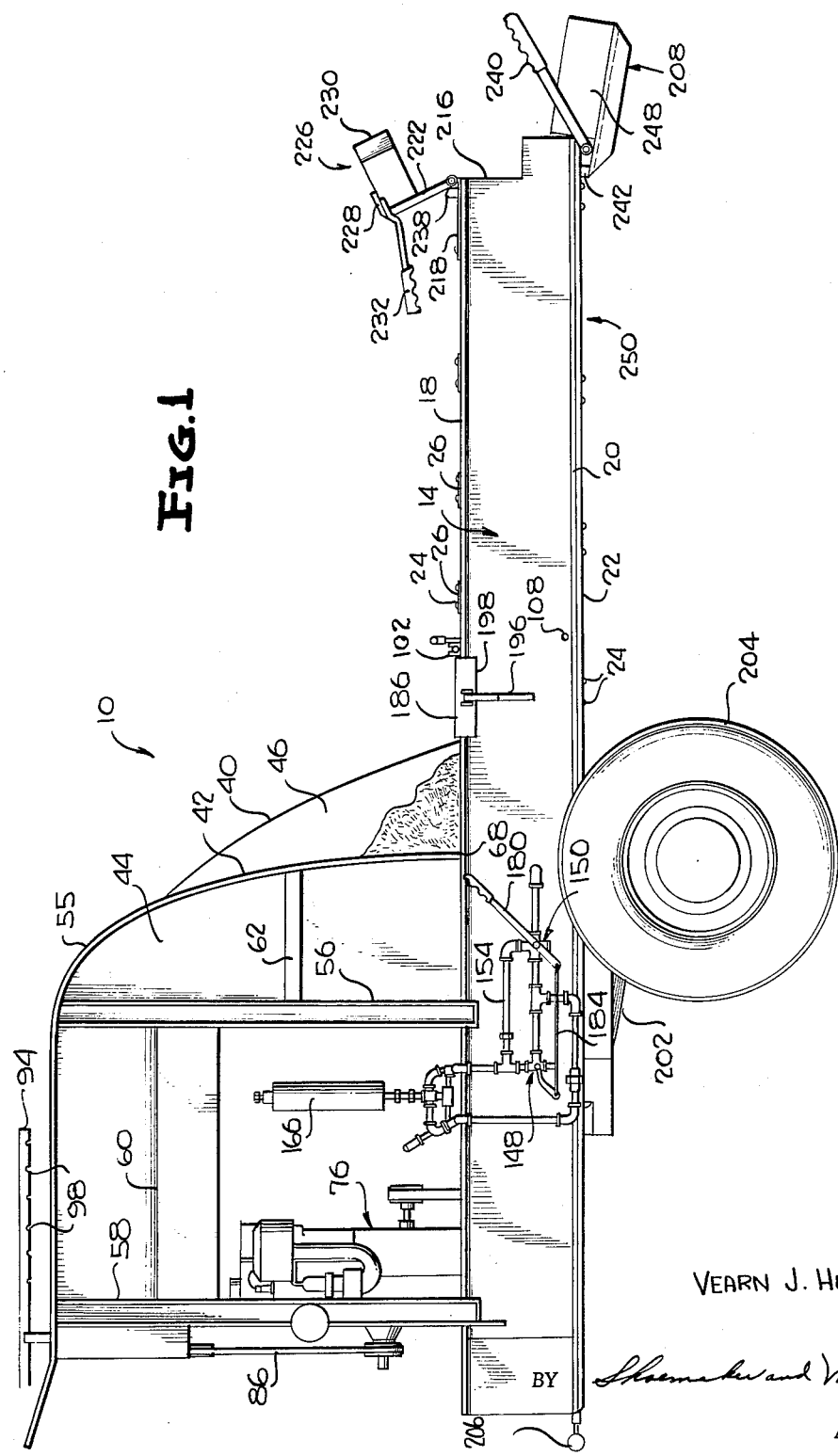
Dec. 28, 1965    V. J. HUFFAKER    3,225,409
ADOBE MAKING MACHINE
Filed Dec. 11, 1963    4 Sheets-Sheet 1
INVENTOR
VEARN J. HUFFAKER
BY
ATTORNEYS Dec. 28, 1965  V. J. HUFFAKER  3,225,409
ADOBE MAKING MACHINE
Filed Dec. 11, 1963  4 Sheets-Sheet 2
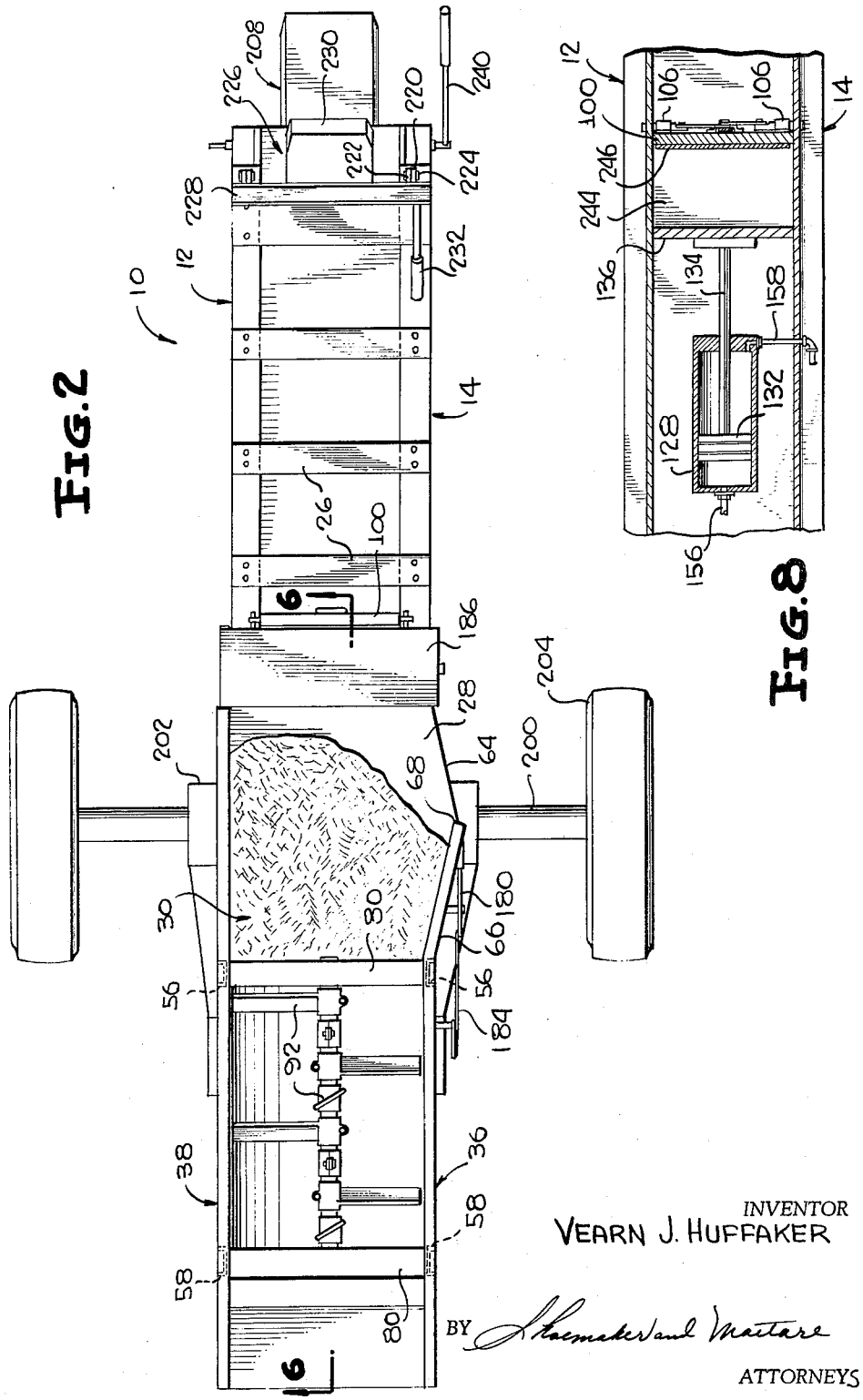
INVENTOR
VEARN J. HUFFAKER
BY Shoemaker and Mattare
ATTORNEYS Dec. 28, 1965 V. J. HUFFAKER 3,225,409
ADOBE MAKING MACHINE
Filed Dec. 11, 1963 4 Sheets-Sheet 3
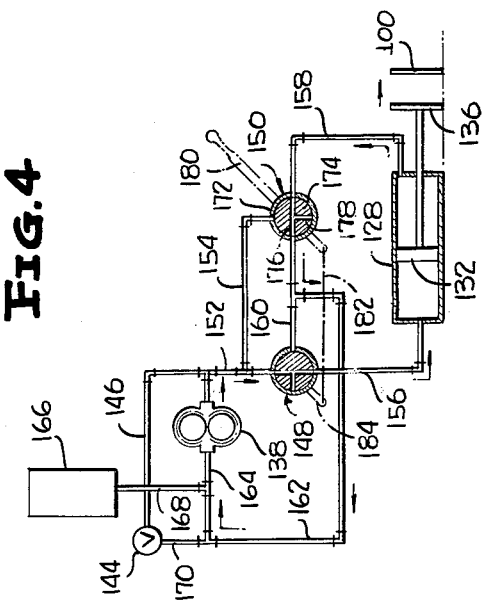
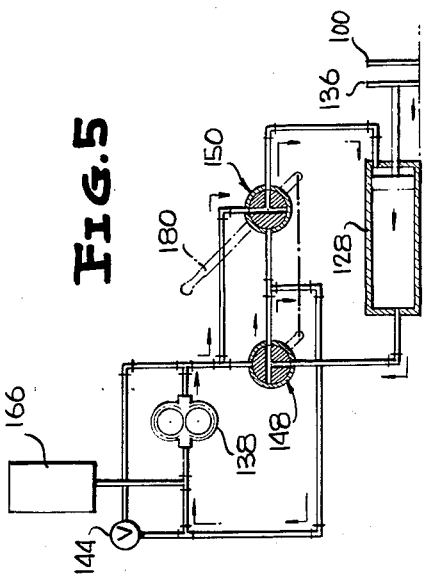
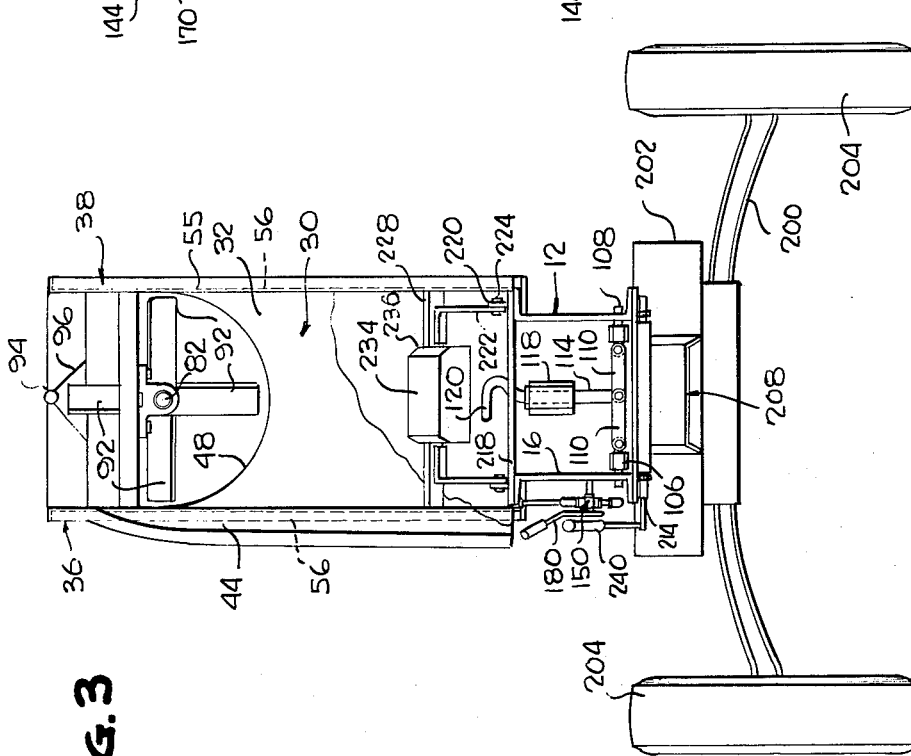
INVENTOR
VEARN J. HUFFAKER
BY *Shoemaker and Mattare*
ATTORNEYS Dec. 28, 1965    V. J. HUFFAKER    3,225,409
ADOBE MAKING MACHINE
Filed Dec. 11, 1963    4 Sheets-Sheet 4
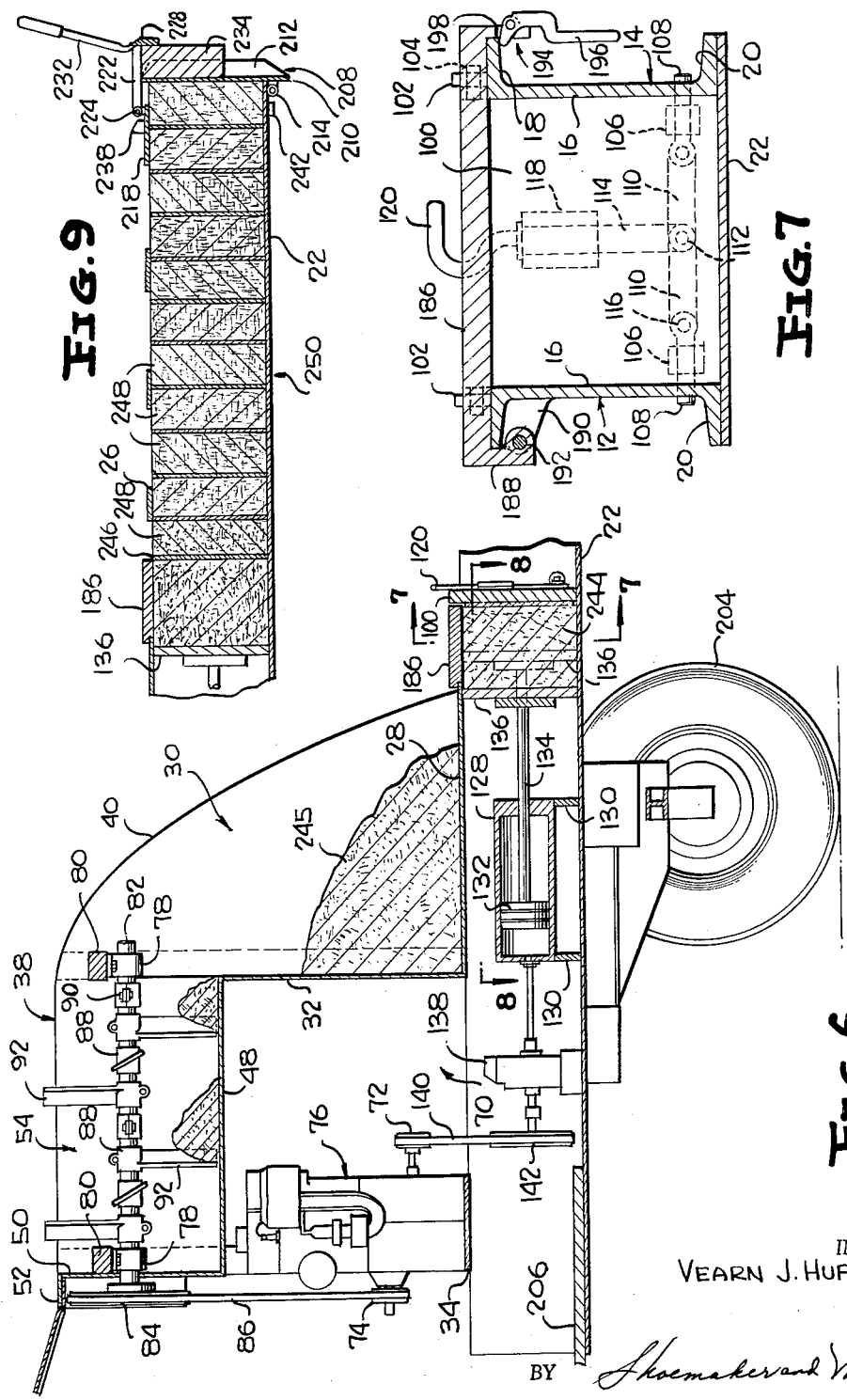
INVENTOR
VEARN J. HUFFAKER
BY Shoemaker and Mattare
ATTORNEYS

United States Patent Office 3,225,409
Patented Dec. 28, 1965

This invention relates to a device for molding articles, and more particularly to a Machine for Making Adobe Blocks.

Adobe is playa or alluvial clay which is in abundant supply throughout the world, and particularly in the South Western portion of the United States. Where adobe is in plentiful supply, it has long been the practice to make building blocks by mixing adobe with water and straw, compressing this mixture into blocks, and then permitting the blocks to harden by baking and drying them in the sun. Adobe blocks for buildings purposes have many advantages, for example, they are economical to manufacture since the basic material is very cheap, they have excellent insulating properties which are superior to most building materials, and they are extremely durable when used for building purposes. The durability is evidenced by buildings composed of adobe which are still standing after 200 years of use and exposure to the elements. It is conventional practice to make adobe blocks by hand. However, because this method of manufacture is so inefficient, consumes a great deal of time, and because of the increased cost of labor, adobe blocks are used less and less for construction even though the demand for them is still high. Accordingly, it is a primary object of this invention to provide a device which will produce adobe blocks of high quality in an efficient and economical manner, is simple to operate and thereby requires only unskilled labor for its operation, and is semi-automatic in operation thereby requiring a minimum number of operators. The adobe blocks produced by this machine are harder, more durable in use, straighter, and more uniform in size and shape than those produced by hand.

It is another object of the invention to provide a machine which both mixes adobe materials and forms them into building blocks.

It is another object of the invention to provide a device for automatically and continuously forming blocks from plastic material and then moving the blocks in succession to a loading area at one end of the device.

It is yet another object of the invention to provide a machine for making blocks from plastic material in a mold wherein previously formed blocks form one side of the mold and after the material is properly and sufficiently compressed in the mold to form a new block, the block forming the side of the mold slips on a friction surface thereby permitting pressure produced in the mold to automatically eject the newly formed block from the mold. Thus, the newly formed blocks are ejected from the mold in a row, and this row of blocks functions as a pressure relieving means for the mold after a new block has been properly formed and compressed in the mold.

It is yet another object of the invention to provide novel hydraulic means for creating pressure in a mold and ejecting from the mold articles produced therein.

It is still yet another object of the invention to provide novel means for opening and closing a mold so that articles may be properly compressed in the mold and removed therefrom.

It is yet another object of the invention to provide a device for pressure molding articles which includes novel gate means which may be selectively used for varying the pressure in the mold and for supporting articles ejected from the mold.

The invention will be best understood from a consideration of the following detailed description taken in connection with the accompanying drawings, wherein:

FIG. 1 is a side elevational view of a preferred form of the invention;

FIG. 2 is a plan view with certain portions of the invention omitted for purposes of clarity;

FIG. 3 is a rear elevational view;

FIG. 4 is a diagrammatic view of the hydraulic control system of the invention;

FIG. 5 is a view similar to FIG. 4 but showing certain portions of the hydraulic controls in a different position.

FIG. 6 is a vertical cross sectional view taken substantially on the plane of line 6—6 in FIG. 2;

FIG. 7 is an enlarged vertical cross sectional view taken substantially on the plane of line 7—7 in FIG. 6;

FIG. 8 is a cross sectional view taken substantially on the plane of line 8—8 in FIG. 6;

FIG. 9 is a vertical cross sectional view through the rear of the machine taken on a plane substantially parallel to the plane of line 6—6 in FIG. 2 and illustrating the invention in use with the rear gate mechanism thereof closed.

As shown in the drawings a preferred form of the invention comprises a block making machine 10 particularly adapted for making adobe blocks preferably of a size 10 inches by 14 inches by 4 inches.

The machine 10 includes a frame consisting of two parallel and spaced channel members 12 and 14 which extend substantially horizontally. As shown in FIG. 7, each of the channel members includes a vertical plate 16 with integral outwardly projecting upper and lower flanges 18 and 20. The plate 22 is preferably rectangular, extends the entire lengths of the channel members 12 and 14, and is secured to the flanges 20 by conventional means such as rivets 24. At the rear of the machine, the flanges 18 are secured together by a plurality of spaced plates 26 which are also preferably secured to the flanges by rivets 24.

A flat plate 28 extends horizontally across a central portion of the upper flanges 18 and secured thereto by conventional means. Plate 28 not only functions as a means for securing the channel members 12 and 14 together but also serves as a floor for a mud bin 30. A vertical plate or partition 32 extends across the flanges 18 and has its lower edge secured to the forward edge of floor 28 as illustrated in FIG. 3. The forward ends of the channel members 12 and 14 are secured together by a horizontally extending engine support plate 34 which extends across and is secured to the upper flanges 18. A pair of generally rectangular plates 36 and 38 have their lower edges secured to the free edges of upper flanges 18, plate 28 and plate 34, and the plates 36 and 38 extend upwardly from the plates 34 and 28 in parallel spaced relationship. The rear end portions of plates 36 and 38 have convexly curved edges 40 and 42 which comprise side walls for the mud bin 30. As shown in FIGS. 1, 2, and 3, edge 42 is curved more sharply than edge 40 thereby defining an end portion 44 which is shorter than the end portion 46 defined by the curved edge 40.

The upper edge of the partition 32 is formed with a semicircular recess, and a generally horizontally extending semicircular plate 48 has its rear edge secured in this recess. A small vertically extending plate 50 has its lower edge secured to the forward edge of the plate 48 and extends between and is secured to the side walls 36 and 38. An upper edge portion of the plate 50 is deflected forwardly 90° to form a horizontal flange 52 extending between the upper edges of plates 36 and 38. The upper portions of plates 36 and 38 in conjunction with the plates 50 and 48 enclose and define a mixing chamber 54 which communicates at its rear end with an upper portion of the mud bin 30. Preferably, the exposed edges of the plates 36 and 38 are rolled or beaded as indicated at 55 so as to increase the strength thereof and to reduce the sharpness thereof. Preferably, the plates 36 and 38 are strengthened and reinforced by structural elements secured thereto such as the vertical channel members 56 and 58 and the horizontal plates 60 and 62.

As shown in FIG. 2, the left side of plate 28 has canted edges 64 and 66 forming a triangular portion which projects outwardly beyond the channel member 14. The end portion 44 of plate 36 is deflected outwardly in vertical alignment with the edge 66, and the bottom edge of portion 44 is secured to edge 66 which terminates at the apex 68 of the triangular portion.

As shown in FIG. 6, plates 32, 34 and 48 define an enclosed engine chamber 70 which contains a conventional internal combustion engine mounted on the engine support plate 34 and having power take-off pulleys 72 and 74 rotatably driven thereby. As illustrated in FIG. 1, the plates 36 and 38 are preferably cut out between the channel members 56 and 58 and the plate 48 so as to provide access to and cooling air for the engine 76.

A pair of bearings 78 are secured within chamber 54 on bearing support members 80 which extend horizontally across the ends of chamber 54 and are secured to members 56 and 58. Bearing members 78 rotatably support a shaft 82 which has a drive pulley 84 secured to its forward end and rotatably driven by a belt 86 entrained thereover and over the take-off pulley 74. A plurality of split sleeves 88 are frictionally clamped to the shaft 82 by means of bolts 90 extending through opposing flanges on opposite ends of each sleeve. A paddle or mixing blade 92 has one of its ends secured to each of the sleeves 88 so that the paddle extends radially outwardly therefrom. Each paddle 92 is preferably canted in relation to the axis of shaft 82 so that it functions in the manner of a propellor or screw. Each paddle is preferably angularly displaced from each adjacent paddle 90°. The ends of the paddles have only a small working clearance with the sides and bottom of the mixing chamber 54.

Preferably, a spraying means is mounted above the mixing chamber 54 for spraying water thereinto. This spraying means may comprise an elongated pipe or tube 94 mounted above the paddles 92 by means of a support bracket 96 secured on flange 52. Spraying pipe 94 has one of its ends closed and its other end connected to a source of water under pressure. The underside of the pipe is provided with a plurality of spaced apertures or spraying nozzles 98 as shown in FIG. 1.

A rectangular mold door 100 is slidably and removably mounted between the central portions of the channel members 12 and 16. A notched lug 102 is secured to the upper surface of each of the flanges 18 so that a laterally extending pin 104 fixed to each upper corner of the door may slidably extend into the notched lug when the door is fully inserted between the plates 16. A tubular bushing 106 is secured to the lower rear face of the door adjacent to opposite sides thereof as shown in FIGS. 7 and 8. A latch pin 108 is slidably mounted in each bushing 106. A pair of toggle levers 110 have their inner ends pivotally connected together and to the lower end of a vertically slidable operating rod 114 by means of a pivot pin 112. The outer end of each toggle lever 110 is pivotally connected to the inner end of one of the latch pins 108 by a pivot pin 116. The rod 114 is vertically slidably mounted within a tubular bushing 118 fixed to the rear face of door 100, and the upper end of rod 114 is formed into a hand grip 120. The door 100 may be easily removed from between the plates 16 merely by grasping and lifting upwardly the hand grip 120 whereupon operating rod 114 slides vertically upwardly in bushing 118 so as to withdraw latch pins 108 out of bores formed through plates 16. When the toggle levers 110 contact the lower end of bushing 118, the pins 108 are fully withdrawn from the bores through plates 16 whereupon further upward movement of hand grip 120 slidably removes the door 100 from between plates 16. A hydraulic cylinder 128 is fixedly mounted to the frame members 12 and 14 forwardly of door 100 by support members 130. Piston 132 is slidably mounted in hydraulic cylinder 128 and has secured thereto a piston rod 134 which extends rearwardly therefrom. The rear end of rod 134 is fixed to a pressure plate 136 slidably mounted between the plates 16.

Pump 138 is mounted on plate 22 forwardly of the hydraulic cylinder and driven by a belt 140 entrained over power take-off pulley 72 and pump pulley 142. As shown in FIGS. 4 and 5, the outlet of pump 138 is connected to a pressure relief valve 144 by conduit 146, and is connected to control valve 148 and 150 by conduits 152 and 154. Control valve 148 is connected to the forward end of cylinder 128 by conduit 156, and control valve 150 is connected to the rear end of cylinder 128 by conduit 158. Control valves 148 and 150 are connected to each other by conduit 160, and are connected to the inlet of pump 138 by conduits 160, 162 and 164. A hydraulic supply reservoir 166 is connected to the pump inlet by conduits 168 and 164, while the outlet of pressure relief valve 144 is connected to the pump inlet by conduits 170 and 164.

Each of the control valves 148 and 150 include a hollow cylindrical housing 172 with a cylindrical valve member 174 rotatably mounted therein. Each valve member 174 is formed with a diametrical passage 176 therethrough and a radial passage 178 extending perpendicular to the passage 176. An operating handle 180 extends perpendicular to the axis of valve member 174 and is secured thereto. One end of handle 180 projects slightly beyond the opposite side of the valve member and is pivotally connected to one of a link 182. The other end of link 182 is pivotally connected to an arm 184 extending parallel to the handle 180 and fixed to valve member 174 of the valve 148. By pivoting the operating handle 180 to the position shown in FIG. 4, the valve members 174 are simultaneously rotated to a position so as to supply fluid pressure to the forward end of cylinder 128 and exhaust the rear end of cylinder 128 to reservoir 166 and the inlet of pump 138. By pivoting the operating handle 180 to the position shown in FIG. 5, the rear end of cylinder 128 is supplied with fluid presure, while the forward end thereof is vented to the reservoir and pump inlet. This causes the pressure plate 136 to be moved rearwardly away from the mold door 100. The pressure relief valve 144 is preferably adjustable and may be replaced by an adjustable restriction valve.

As shown in FIGS. 1, 6 and 7, a lid 186 extends across the upper flanges 118 directly forwardly of door 100, and as shown in FIG. 6, the forward edge of the lid is recessed so as to receive and be supported on the rear edge of bin floor plate 28. A flange 188 projects downwardly from one side of lid 186 and is pivotally connected to an ear 190 on member 12 by means of a pivot pin 192. The other side of the lid may be releasably latched to the member 14 by means of a conventional latch mechanism 194 which may comprise a lever 196 pivotally connected to a flange 198 on the lid, and the lever 196 having a cam portion adapted to releasably extend under flange 18 of member 14.

The channel members 12 and 14 extend across and are connected to an axle 209 by a conventional suspension mechanism 202. Wheels 204 including pneumatic tires are rotatably journalled on the outer ends of the axle assembly 200. Preferably, a conventional tow bar 206 is connected to the forward ends of the members 12 and 14 whereby the machine 10 may be towed by a powered vehicle as a trailer.

A rear gate 208 comprising a flat plate 210 having side flanges 212 deflected rearwardly therefrom is pivotally connected to the lower rear corners of the channel members 12 and 14 by means of a pivot pin 214 which extends through apertures in overlapping ears formed on the lower edge of plate 210 and the lower rear corner of the channel members. As shown in FIG. 9, when the gate is pivoted to a vertical position, it closes the space between the ends of the channel members.

As shown in FIG. 1, the upper rear corners of the members 12 and 14 are provided with rectangular notches 216. A rectangular plate 218 extends across the flanges 18 directly forward of notches 216. As shown in FIGS. 1 and 3, plate 218 is provided on its upper surface with a pair of parallel ears 220 to which are pivoted a pair of parallel arms 222 by means of pivot pins 224. The arm 222 comprise part of a gate latch or holding means 226 for holding the gate 208 in vertical closed position. A plate 228 extends across and is connected to the free ends of arms 222. A latch operating handle 232 is connected to one end of plate 228 so as to extend substantially normal to arms 222. A generally rectangular solid block 234 is secured to plate 228 and arms 222, and this block is provided with rectangular recesses 236 so that the central portion of the block may pivot downwardly between plates 16 and flanges 212 as illustrated in FIG. 9 and FIG. 3 so that the weight of the block will maintain gate 208 in a closed position. For releasing gate 208, latch means 226 may be pivoted upwardly to the position illustrated in FIG. 1. Plate 218 is provided with stop lugs 238 adapted to contact arms 222 so as to hold the latch means in the position illustrated in FIG. 1. An operating lever 240 is connected to one side of gate 208 for pivoting the gate to and from closed position. A stop lug 242 is secured to the rear end portion of plate 22 and adapted to be contacted by the lower edge of gate 208 when it is swung to an open position as illustrated in FIG. 1 so as to maintain the gate in a substantially horizontal position.

The mold door 100, the pressure plate 136, the lid 186, and the central portions of plate 22 and channel members 12 and 14 define a mold chamber 244. When the piston and pressure plate 136 are fully forward, the mold chamber is 10 inches by 14 inches by 7 inches. When fluid pressure is admitted to the forward end of cylinder 128 so as to push piston 132 and pressure plate 136 fully rearwardly, the mold chamber is reduced in size to 10 inches by 14 inches by 4 inches.

In operation, the mixing chamber 54 is substantially filled with adobe clay and some straw. The engine 76 is started so as to rotate shaft 82 and the paddles 92 secured thereto and so as to drive pump 138. A desired quantity of water is injected into the mixing chamber by means of the nozzles 98 in spraying pipe 94. As the shaft 82 is rotated by engine 76, the paddles 92 thoroughly mix the adobe clay, the straw and water, so as to form a dampened mixture of adobe soil with straw therein. This dampened mixture is propelled rearwardly by the paddles 92 due to the shape and inclination of the paddles which function in the manner of a screw or auger while thoroughly mixing the ingredients in the chamber 54. After the adobe, water and straw are thoroughly mixed, they are ejected rearwardly by the paddles 92 into the mud bin 30 so as to form a pile of adobe mixture 245 in the bottom of the mud bin as illustrated in FIG. 6. The operator unlatches the lid latch 194 by means of handle 196 and pivots the lid 186 to an open position. The operator stands on the left side of the machine 10, that is, the side having the curved edge 42 on the side wall end portion 44. Because the curved edge 42 is spaced forwardly of lid 186, the operator may easily rake or shovel a sufficient quantity of the adobe mixture 246 into the mold chamber 244 to fill this chamber. Of course, before the operator fills the mold chamber, he makes certain that the valve operating handle 180 is in the forward position illustrated in FIG. 5 so that the piston 132 and pressure plate 136 are fully forward. Preferably, before the mold chamber 244 is filled, a thin metal separator plate preferably of No. 11 gauge and 9¾ inches by 13¾ inches is placed adjacent the forward face of the door 100, but this plate may be placed against the rear face of the pressure plate 136 if desired. This plate is indicated by the reference numeral 246 in FIG. 8.

After the mold chamber 244 has been filled with the dampened mixture 246, the operator moves the valve operating handle 180 to the position shown in FIG. 4 so that the valve 148 supplies fluid pressure to the forward end of cylinder 128 and the valve 150 vents the rear end of cylinder 128 to reservoir 166 and the inlet of pump 138. The pressure in the forward end of cylinder 128 causes piston 132 and pressure plate 136 to move rearwardly substantially 3 inches to compress the dampened mixture 246 in mold chamber 244 into a rectangular block 4 inches thick. Of course, as the piston 136 moves rearwardly to compress the mixture in the mold chamber, the fluid pressure within the forward end of the cylinder increases, and after the mixture in the mold chamber has been compressed substantially 3 inches, fluid pressure in the forward end of the cylinder 128 reaches a predetermined value at which the pressure relief valve 144 opens to prevent the pressure in the forward end of the cylinder from increasing above this predetermined value. The operator then moves the valve operating handle 180 to a neutral position, or preferably, to the position shown in FIG. 5 so as to move pressure plate 136 away from the newly formed block 248 formed in the mold chamber 244. The operator then removes door 100 from between channel members 12 and 14 by lifting upwardly on handle 120 so as to withdraw pins 108 out of the apertures through the members 12 and 14. When the pins 108 are fully withdrawn, the toggle levers 110 abut the lower end of sleeve 118 thereby permitting the operator to fully remove the door by further lifting upwardly on the handle 120. The operator then again moves the valve operating handle 180 to the position illustrated in FIG. 4 whereupon piston 132 is moved rearwardly along with pressure plate 136 so as to force the newly formed block 248 from the mold chamber and rearwardly of the normal position of the door 100. Thus, it can be seen that piston 132 and pressure plate 136 must move back and forth at least the thickness of mold chamber 244 (preferably 7 inches) plus the thickness of door 100. After the newly formed block 248 has been forced by pressure plate 136 from the mold chamber, the operator then moves valve operating handle 180 to the position shown in FIG. 5 so as to move piston 132 and pressure plate 136 to the maximum forward position. The operator then replaces and latches door 100 in position as illustrated in FIG. 6, opens lid 186, inserts a new separator plate 246 against door 100, refills the mold chamber 244 with the dampened mixture 245, closes and latches lid 186 as illustrated in FIG. 7 and then operates the valve operating handle 180 to again form a new block 248 in mold chamber 246. This procedure is repeated over and over to form as many adobe blocks 248 as desired. Since the mixture 245 is composed primarily of slightly dampened adobe clay, once it is compressed in mold chamber 244 into an adobe block, it will hold its shape.

Normally, during operation of the machine 10, the rear gate 208 and the gate latch 226 are in the opened position illustrated in FIG. 1. The rear end portions of the members 12 and 14 and plate 22 comprise a conveyor means or discharge chute 250 for removing blocks from the machine. After the chute 250 is filled with blocks 248 as illustrated in FIG. 9, with the gate 208 opened as illustrated in FIG. 1, a block is automatically deposited on top of gate 208 each time a new block is ejected from the mold chamber 244.

Once the chute 250 becomes filled with blocks, it is no longer necessary to use door 100 when compressing mixture 245 to form blocks 248 in mold chamber 244. The length and coefficient of friction of the inner surfaces of the chute 250 are such that when the chute is filled with blocks 248, the static frictional resistance to sliding between the blocks and the inner surfaces of the chute is such that door 100 may be omitted and the mixture in mold chamber 244 may be compressed by pressure plate 136 directly against the last or previously formed block in the forward end of chute 250. Of course, there is a separator plate 246 between the mixture in the mold chamber and the forwardmost block 248. With door 100 removed and gate 208 open, valve operating handle 180 is moved to the FIG. 4 position to cause pressure plate 136 to compress the mixture 245 in the mold chamber 244 directly against the blocks filling chute 250. After the mixture in the mold chamber has been compressed the proper amount (preferably 3 inches), the pressure within the mold chamber has been built up to a point where this pressure overcomes the static friction between the blocks in chute 250 and the inner surfaces of the chute. Therefore, the pressure within the mold chamber slides the blocks in the chute rearwardly and deposits the rearmost block on the rear gate 208 as illustrated in FIG. 1. At the same time, piston 132 and pressure plate 136 eject the newly formed block rearwardly from mold chamber 244. The operator then moves the valve operating handle 180 to the FIG. 5 position so as to move pressure plate 136 to its forwardmost position, opens lid 186, inserts a new separator plate 246 against the forward face of the last formed block, fills the mold chamber with mixture 245, closes and latches lid 186 and then again moves handle 180 to the FIG. 4 position so as to again simultaneously form a new block, eject it from the mold chamber and move all the blocks rearwardly so as to cause the last block in the chute 250 to be deposited on gate 208. Thus, by eliminating the use of door 100 and permitting the chute 250 to act as an automatic pressure relief means for the mold chamber 244, the machine 10 constitutes means for continuously and simultaneously forming blocks in a mold, ejecting the blocks from the mold and conveying them to a delivery or discharge point.

After the blocks 248 are deposited on the gate 208, they are removed and stacked where they can be dried and baked in the sun. After the blocks have been fully dried and baked, they are ready for use in constructing adobe structures.

In the event the adobe clay in the mixture 245 contains too much sand or other substances, the coefficient of friction of the mixture may be reduced to the point that the finished blocks 248 in chute 250 may slide before the mixture in mold chamber 244 is properly compressed. In this event, it is desirable to close gate 208 and latch it by latch 226 as illustrated in FIG. 9 so that the completed blocks 248 will not slide until the mixture 245 in mold chamber 244 has been properly compressed to form a new block. After the new block in the mold chamber has been properly compressed, latch 226 and gate 208 are pivoted to the positions illustrated in FIG. 1 whereupon piston 132 and pressure plate 136 will eject the newly formed block from the mold chamber and cause the rearmost block to be deposited on gate 208. It is not necessary to manually open gate 208 since the pressure on piston 132 acting on the blocks in chute 250 will automatically cause this gate to open once it is unlatched. It is to be noted that lug 242 retains gate 208 in a slightly inclined position once it is opened so that blocks 248 may be easily removed from the gate.

The separator plates 246 prevent adjacent blocks from sticking together. These plates may be separated from the blocks once they are removed from the machine 10 or after they have been properly sun baked.

Since the machine 10 is mounted on wheels and is provided with a tow bar 206, it may be easily moved or transported to any desirable site.

The pressure relief effect for mold chamber 244 caused by the static friction between blocks 248 and the inner surfaces of chute 250 may be varied by changing the angle of inclination of the chute, changing the length of the chute, or changing the coefficient of friction of the inner surfaces of the chute. By these means, the use of the rear gate 208 as an abutment means when closed may be eliminated even though the adobe clay used in mixture 245 has an undesirably high or low coefficient of friction.

Inasmuch as various changes may be made in the form, location and relative arrangement of the several parts without departing from the essential characteristics of the invention, it will be understood that the invention is not to be limited except by the scope of the appended claims.

I claim:

1. A mobile apparatus for molding blocks from a plastic moldable mixture, having thereon a mixing chamber for mixing the plastic mixture and discharging the mixture into an elongate trough having longitudinal sides and a bottom and having a forward end and a rear end, means forming a mold chamber at said forward end including, with said longitudinal sides of said trough, a pressure plate of a polygonal contour conforming to the interior cross sectional contour of the trough and slidable in and longitudinally of the trough and spanning the trough, the mold chamber further including movable means in the trough rearwardly of and coacting with said pressure plate for closing one end of the mold chamber, means connected with said pressure plate for applying power thereto to move the pressure plate relative to said movable means and beyond said one end of the mold chamber when the movable means is moved from said one end, the said trough having a length to accommodate a multiplicity of blocks molded in said mold chamber by the pressure plate and moved rearwardly in a row by the pressure applying power means, a gate plate pivotally mounted on the rear end of the trough to swing rearwardly and downwardly on a transverse axis to an open position, means limiting the downward swinging of the gate plate to a position slightly below horizontal providing a receiving surface for a block ejected from the trough, means for securing the gate plate in raised trough closing position comprising a heavy body, means supporting said body for rearward and downward swinging on an axis extending across the top of the trough to position the body against the rear side of the raised gate plate, and a handle connected to said body supporting means and extending upwardly therefrom, in the gate securing position thereof, for facilitating swinging of the gate securing means into and out of its operative positions.

2. The invention as defined by claim 1, wherein the said means supporting the said heavy body comprises a pair of arms which extend rearwardly from the last mentioned axis when the body is in the said position against the rear side of the gate plate.

3. The invention as defined by claim 2, wherein the said means supporting the said heavy body comprises a pair of arms which extend rearwardly from the last mentioned axis when the body is in the said position against the rear side of the gate plate, and the last said axis being parallel with the gate plate axis and positioned forwardly relative to the gate plate axis.

4. The invention as defined by claim 1, wherein the top rear corner portions of said longitudinal sides of the trough are cut away forming notch openings.

5. The invention as defined by claim 1, wherein said gate plate has transversely spaced rearwardly projecting vertical flanges between which said heavy body is positioned when said body is in the said position against the rear side of the raised gate.

References Cited by the Examiner
UNITED STATES PATENTS

| | | | |
|---|---|---|---|
| 193,265 | 7/1877 | Miller | 100—88 |
| 692,605 | 2/1902 | Bratton | 25—12 |
| 720,218 | 2/1903 | Brush | 25—15 |
| 1,160,010 | 11/1915 | Svenson | 292—41 |
| 1,319,011 | 10/1919 | Kuretich | 292—36 |
| 1,374,173 | 4/1921 | Andrews | 25—2 |

(Other references on following page)

| | | UNITED STATES PATENTS | | |
|---|---|---|---|---|
| 1,448,339 | 3/1923 | Fernholtz | 25— | 12 |
| 1,721,514 | 7/1929 | Henry | 25— | 121 |
| 2,537,920 | 1/1951 | Smith | 25— | 12 |
| 2,672,808 | 3/1954 | Eldert | 100— | 88 |
| 3,008,199 | 11/1961 | Jeppesen | 25— | 12 |
| 3,070,003 | 12/1962 | Stacy | 25— | 15 |

FOREIGN PATENTS 578,986 7/1924 France.
830,553 3/1960 Great Britain.

WILLIAM J. STEPHENSON, *Primary Examiner.*

MICHAEL V. BRINDISI, *Examiner.*